Figure 1:
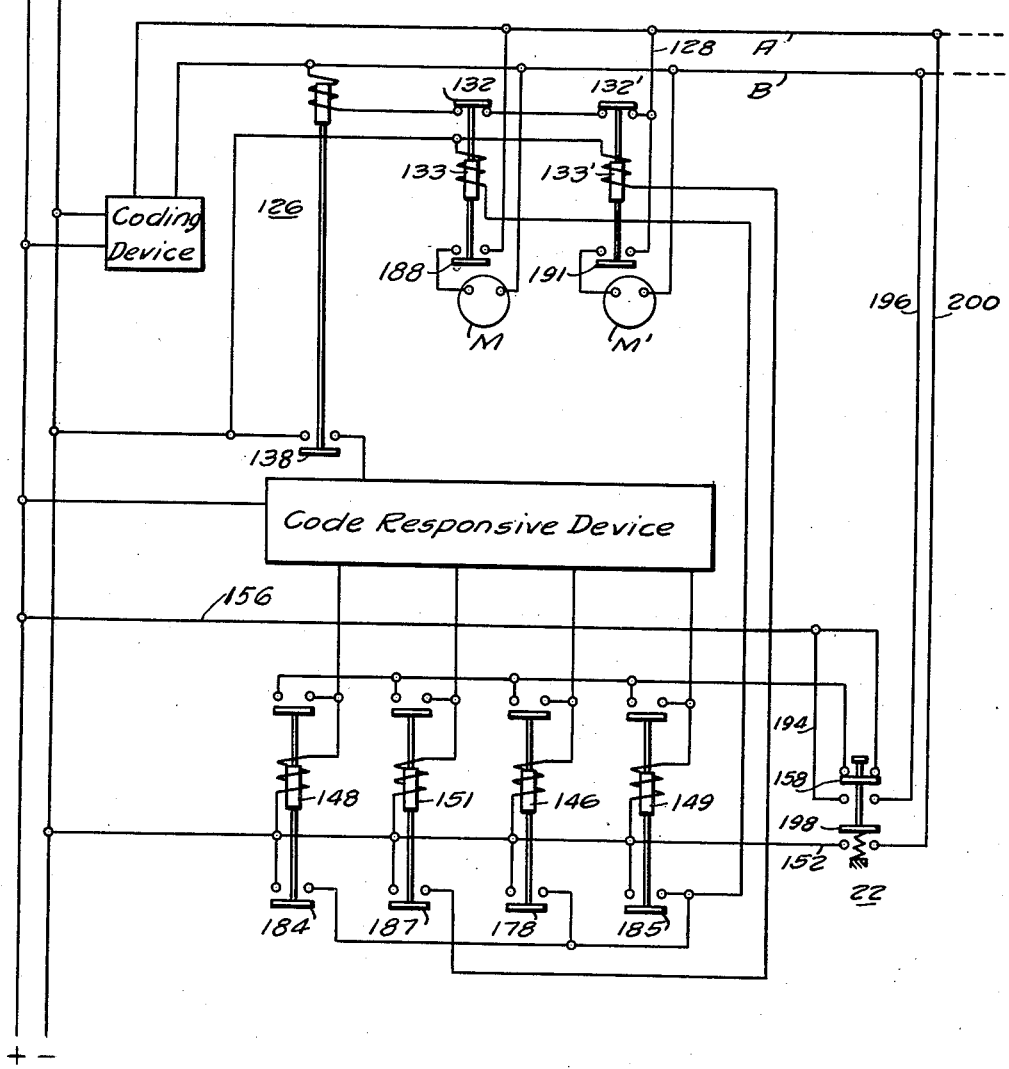

March 16, 1948.  W. A. DERR  2,438,000
TELEMETERING SYSTEM
Filed Oct. 31, 1945  2 Sheets-Sheet 1

WITNESSES:
E. A. M?Closkey.
F. V. Giolma

INVENTOR
Willard A. Derr.
BY
S. M. Crawford
ATTORNEY

March 16, 1948.   W. A. DERR   2,438,000
TELEMETERING SYSTEM
Filed Oct. 31, 1945   2 Sheets-Sheet 2

Patented Mar. 16, 1948

2,438,000

UNITED STATES PATENT OFFICE 2,438,000

TELEMETERING SYSTEM

Willard A. Derr, Wilkinsburg, Pa., assignor to Westinghouse Electric Corporation, East Pittsburgh, Pa., a corporation of Pennsylvania Application October 31, 1945, Serial No. 625,906

7 Claims. (Cl. 177—351)

My invention relates, generally, to signalling systems and it has reference, in particular, to telemetering systems which may be used in conjunction with supervisory control systems.

Systems of remote metering or telemetering which are in common use for transmitting metering indications over supervisory control channels are generally of either the "pick-up" or "drop-out" type. Release of the system at the termination of a metering operation requires, in the first instance, the picking up of a normally deenergized relay at the remote station, and in the second instance, the dropping out of a normally energized relay, which relays are not responsive to metering current. The "drop-out" type of system has limitations in that it must be calibrated before each reading, and variations in the circuit impedance may even then affect the readings. The "pick-up" type of system, as heretofore used, has been limited in its application to the telemetering of alternating current amperes and volts, since it could not be used with many types of transmitters such as are used for metering other quantities, for the reason that they present variable impedance paths, or even open circuits under different operating conditions, and thus do not provide a uniform operating circuit for the reset relay.

Heretofore, it has been necessary to use both the "pick-up" and "drop-out" types of metering systems on the same supervisory control channel, where indications such as those of kilowatts, reactive kilovolt amperes, synchronism and mechanical quantities such as water level, gate position, etc. were desired, in addition to indications of other alternating current amperes and volts. This use of both types of telemetering systems on a single channel naturally increases the cost of the installation. It also unduly complicates the system from the service and maintenance viewpoint, and presents a more potent source of trouble.

Generally stated, it is an object of my invention to provide a telemetering system for use with supervisory control systems, which shall be simple and inexpensive to manufacture and shall be universal in its application.

More specifically, it is an object of my invention to provide a telemetering system of a universal type which is unaffected by the variable impedance characteristics of different kinds of transmitters which may be used therewith.

It is also an object of my invention to provide, in a telemetering system, an operating circuit for a telemetering reset relay at a remote station, which is independent of the metering indication transmitting circuit connected thereto.

Yet another object of my invention is to provide a substantially fixed impedance operating circuit for a reset relay of the "pick-up" type in a telemetering system.

Another object of my invention is to provide a universal telemetering system which may be readily used in conjunction with supervisory control systems.

A further object of my invention is to provide for utilizing in a telemetering system, a unidirectional current device for providing a low impedance operating circuit for a reset relay in response to a control potential of reverse polarity relative to the metering potential.

Other objects will in part be obvious, and will in part be explained hereinafter.

According to one embodiment of my invention, the line relays of a supervisory control system are disconnected from the signalling channel of the system whenever a metering point is selected, and the metering transmitter and receiver are connected to the channel at the remote station and control station, respectively. A reset relay of the "pick-up" type is used at the remote station to provide a holding circuit for the metering relay, whereby disconnection of the telemetering transmitter from the signalling channel may be affected through operation of the reset relay to restore the channel for performing supervisory control functions. The reset relay is connected in series circuit relation with the signalling channel during the metering operation and is unaffected by the relatively low level metering current. Operation of this relay is effected by shunting the channel by means of a unidirectional current device so connected between the reset relay and the telemetering transmitter as to be substantially non-conductive as regards the supervisory control and metering currents, and yet provide a relatively low impedance path for a reset current of reverse polarity. The reset potential applied to the channel is reversed in response to operation of the reset button at the control station when resetting.

Figure 2:
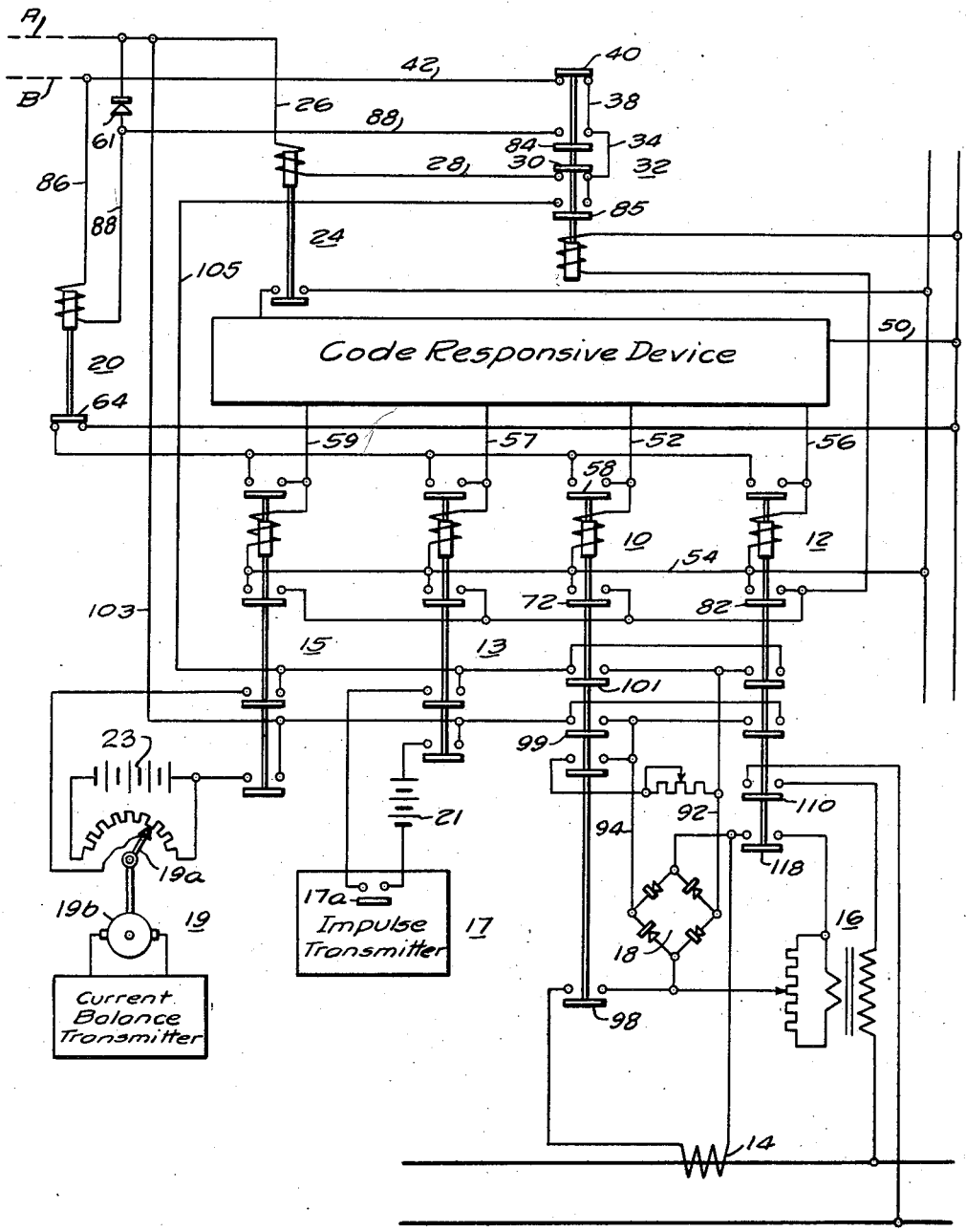

For a more complete understanding of the nature and scope of my invention, reference may be made to the following detailed description, which may be studied in connection with the accompanying drawings, in which:

Figure 1 is a diagrammatic view of the control station equipment in a supervisory control and telemetering system embodying the invention in one of its forms; and Fig. 2 is a diagrammatic view of the remote station equipment of the supervisory control and telemetering system for use in conjunction with the control station equipment of Fig. 1.

Referring to Figs. 1 and 2 together, a supervisory control and telemetering system is illustrated which constitutes an improvement over the system described in detail in Patent No. 2,239,552 which issued on April 22, 1941, to Gennero De Croce and Willard A. Derr. In the present system, apparatus similar to the apparatus of the De Croce et al. patent is numbered identically with that shown in the De Croce et al. patent, and additional apparatus is identified by reference numbers not appearing in said patent.

As shown, a coding device is located at the control station of Fig. 1 for transmitting coded impulses over the line conductors A and B constituting the signalling change to the remote station of Fig. 2, from which indications of current, potential and other quantities are to be transmitted to the control station.

A code responsive device at the remote station selectively actuates one of a plurality of control relays 10, 12, 13 and 15, which function to connect different types of indication transmitting devices represented by the current transformer 14, the potential transformer 16, the impulse metering transmitting device 17, and the current balance indication transmitting device 19, respectively, to the line conductors A and B.

The current transformer 14 and the potential transformer 16 may be connected to the line conductors through a rectifier circuit 18, while the transmitting devices 17 and 19 may be provided with sources of potential 21 and 23, for connection to the line conductors.

A code responsive device at the control station responds to the selective code impulses transmitted over the line conductors A and B by the coding device at the remote station to connect indicating devices such as the meters M and M' to respond to the characteristics of the different signal potentials applied to the line conductors at the remote station.

As described in the De Croce et al. patent, a line or reset relay 20 is provided at the remote station for effecting disconnection of the different transmitting devices from the conductors A and B. The relay 20 may be adjusted to respond only to a line current which is of a value higher than that of the signal or metering current transmitted to the control station from the remote station, so as to be unaffected by the metering current. A reset switch 22 may be provided at the control station for applying a reset potential to the conductors A and B for operating the line relay so as to effect disconnection of the transmitting device.

Referring to Figs. 1 and 2 in more detail, it will be seen that a supervisory control relay 24 is provided at the remote station for energization in response to signal impulses transmitted by the coding device at the control station. The circuit for the relay 24 extends from the conductor A through conductor 26, operating winding of relay 24, conductor 28, contact element 30 of a relay 32, conductors 34 and 38, contact element 40 and conductor 42 to conductor B.

The code responsive device at the remote station may be any suitable type, examples of which are well known in the art, which is responsive to selective coded impulses transmitted by the relay 24 to selectively energize one of the associated control relays 10, 12, 13 and 15, in accordance with the coded impulses applied thereto. The circuit for the relay 10, for example, extends from one side of the source of direct current power through the conductor 50, the code responsive device, conductor 52, the winding of relay 10, and conductor 54 to the other side of the power source. A similar circuit for the relay 12 extends through conductor 56, the operating winding of the relay 12, and conductor 54. Circuits for the relays 13 and 15 extend through conductors 57 and 59, respectively, to conductor 54. Holding circuits are provided for each of the relays through contact element 64 of the relay 20, so that operation of the relay 20 effectively deenergizes these control relays.

The operation of any one of the control relays 10, 12, 13 and 15 provides an operating circuit for the relay 32 which functions to disconnect the supervisory relay 24 from the channel and connect different ones of the indication transmitting devices 14, 16, 17 and 19 and their sources of signal potential to the conductors A and B through contact elements 84 and 85.

As shown in Fig. 2, the different indication transmitting devices may have widely differing circuit characteristics. Both the current transformer 14 and potential transformer 16 are disposed to be connected to the line conductors A and B through a rectifier bridge circuit 18 whose impedance may be considered to be substantially constant for a given value of current. The transmitting device 17 may be of the impulse transmitting type, being for example, provided with a contact device 17a which may open and close so as to produce impulses either having a duration proportional to the quantity being metered, or having a frequency which is proportional to the quantity being metered. Under these conditions, the impedance of the path presented by the transmitting device 17 to the conductors A and B may vary from a negative value when a potential is impressed on the conductors A and B from the source 21, to infinity when the contact element 17a is in the open circuit position. Similarly, the impedance presented by the current balance type transmitting device 19 relative to the conductors A and B, may vary over a wide range, depending on the operating position of the contact arm 19a, which is disposed to be actuated by a motor 19b under the control of a Kelvin balance movement, to apply to the conductors a potential which varies in magnitude with the quantity being metered.

In order to provide for positive operation of the line or reset relay 20, independently of the relatively wide range of impedance values which may be presented by one or another of transmitting devices connected to the conductors A and B, a rectifier device 61 may be connected in shunt circuit relation with the conductors A and B between the line relay 20 and the metering devices. The rectifier device 61 may be so connected as to provide a relatively high impedance path to the metering signal potentials impressed on the conductors A and B by the transmitting devices, and yet provide a substantially constant and relatively low impedance path for an operating current through the operating winding of the relay 20 in response to a reset potential of reverse polarity, which may be applied to the conductors A and B through the reset button 22 at the control station.

The code responsive device at the remote station may be operated in a manner well known in the art to selectively provide an operating circuit for any one of the metering control relays 10, 12, 13 or 15. If the relay 10, for example, is selected, the relay 32 is energized through the circuit extending through contact element 72 of the relay 10. The supervisory control 24 is thereby disconnected from the conductors A and B through contact element 30 of the relay 32. The relay 10 also functions to connect the secondary winding of the current transformer 14 to the rectifier 18 through contact element 98 so that a potential, which is a function of the current flowing in the conductor, is applied to the rectifier and transmitted as a direct current potential to the line conductors A and B through a circuit extending from the positive terminal of the rectifier 18 through conductor 94, contact element 99 and conductor 103 to conductor A, and from the negative terminal of the rectifier through conductor 92, contact element 101, conductor 105, contact element 85, contact element 84, conductor 83, operating winding of the relay 20 and conductor 86 to conductor B. Similar circuits are provided for the other transmitting devices by the other control relays.

At the control station, the supervisory control relay 126 is connected to be energized by the code impulses transmitted by the remote station coding device through a circuit which extends from the conductors A and B through conductor 123, contact element 132' of the meter relay 133', contact element 132, and operating winding of the relay 126 to the conductor B. Actuation of the relay 126 causes closure of its contact element 136 to energize a code responsive device similar to that at the remote station, which accordingly results in selective energization of one of the point relays 146, 148, 149 or 151, for example, the current metering point relay 146.

In the operation of the system, a holding circuit is provided for the relay 146 through contact element 158 of the reset switch 22. Similar holding circuits are provided for the other metering point relays 148, 149 and 151, which correspond to the transmitting devices 16, 17 and 19 respectively. Actuation of any one of the relays 146 through 149 results in an energizing circuit for the meter relay 133, through contact elements 178, 184 or 185, respectively. Upon operation, the relay 133 opens contact element 132, disconnecting the supervisory control relay 126 from the conductors A and B, and closes its contact element 139 to connect the meter M to the conductors A and B for response to signal potentials produced by the transformer 14. Operation of the metering point relay 151 likewise provides an energizing circuit for the meter relay 133' through contact element 187, and relay 133' connects the meter M' to the conductors A and B, through contact element 191 for response to impulses produced by the contact element 17a.

In order to disconnect any one of the current metering indication transmitting circuits from the control channel and return the system to normal, the reset switch 22 is actuated to break the holding circuit for whichever one of the relays 146, 148, 149 and 151 is energized, thus deenergizing the corresponding meter relay 133 or 133', and reconnecting the supervisory control relay 126 to the conductors A and B. Actuation of the switch 22 also functions to so connect the conductors A and B to the source of direct current power at the control station as to provide a reset potential which is of the reverse polarity to the metering indication potential applied thereto at the remote station. The reset potential is also of sufficient value to provide a reset current for operating the line or reset relay 20 at the remote station. The circuit for the relay 20 extends from one terminal of the source at the control station through conductor 156, through conductor 194, contact element 158, conductor 196, conductor B, conductor 86, operating winding of the reset relay 20, conductor 88, rectifier device 61, conductor A, conductor 200, contact element 198, and conductor 152 to the other side of the source.

A low impedance path is provided by the rectifier device 61 so that a relatively large operating current flows through the operating winding of the reset relay 20 for releasing the system, independently of the impedance of the signal or metering circuit which may be connected to the conductors A and B. Operation of relay 20 opens the contact element 64 which interrupts the holding circuit of the metering control relays 10, 12, 13 or 15, depending on which one is operated. Upon returning to the deenergized position, the metering control relay 10, etc. deenergizes the control relay 32, which reconnects the supervisory control relay 24 to the line conductors A and B and disconnects the reset relay 20 therefrom.

It will be seen from the above description and the accompanying drawings that I have provided a simple and effective system wherein reset of the system may be readily effected independently of the impedance of the signalling or metering circuit connected to the channel. Instead of requiring the use of several different types of metering systems where different quantities are to be measured which require transmitting devices having variable impedances, all types of metering devices may be used with a single metering system according to my invention. The amount of equipment is thereby greatly reduced and the metering system is substantially simplified. This results not only in lower installation cost but in reduced maintenance expenses.

Since certain changes may be made in the above described construction and different embodiments of the invention may be made without departing from the spirit and scope thereof, it is intended that all the matter contained in the above description and shown in the accompanying drawings shall be considered as illustrative and not in a limiting sense.

I claim as my invention:

1. In a remote signalling system for control and remote stations connected by a signalling channel, transmitting means at the remote station operable to energize the channel with a voltage of one polarity variable in accordance with a condition to be indicated, receiving means at the control station responsive to said energization of the channel, control means at the remote station responsive to a flow of current through the channel in excess of a predetermined value which is greater than that produced by the voltage at the remote station operable to effect disconnection of the transmitting means from the channel, an asymmetric conducting means connected across the channel intermediate the control means and the transmitting means to provide a path of predetermined impedance for a voltage of reverse polarity from the control station, and means at the control station operable to effect energization of the channel with a voltage of said reverse polarity and of sufficient value to produce a current through the control means in the same direction as that produced by the transmitting means and of sufficient value to operate the control means.

2. In a system for indicating at a control station a condition at a remote station connected therewith by a signalling channel, means at the remote station responsive to the condition at said station to apply an indicating potential of a predetermined polarity to said channel, electro-responsive means at the control station responsive to said potential, electro-responsive means at the remote station responsive only to a current greater than produced by said potential of a predetermined polarity for removing said potential from the channel, asymmetric conducting means connected at the remote station to provide a low impedance path through the electro-responsive means at the remote station for an operating current of the same polarity produced by a voltage of the opposite polarity at the control station, and means at the control station operable to apply to the channel a potential of reverse polarity of sufficient value to effect operation of said electro-responsive means at the remote station.

3. In a system for indicating at a control station a condition at a remote station connected therewith by a signalling channel, transmitting means at the remote station operable to effect energization of the channel with a potential of a predetermined polarity variable in accordance with the condition at the remote station which is to be indicated, receiving means at the control station responsive to said potential, electro-responsive means at the remote station operable to remove said potential from the channel, control means operable to effect operation of said electro-responsive means connected in the channel, said control means being responsive only to a current in the channel of larger magnitude than the current produced by said potential of a predetermined polarity, rectifier means of the dry type connected across the channel between said control means and the transmitting means in such direction as to block the flow of current produced by said potential, and means at the control station operable to connect a control potential of reverse polarity and greater magnitude than said potential to the channel at the control station in series circuit relation with said potential.

4. A remote indicating system for use with a supervisory control system operating over a signalling channel between a remote station and a control station each provided with supervisory control receiving and transmitting equipment comprising, indication transmitting means at the remote station operable to produce an indicating potential having a characteristic which varies in accordance with a condition to be indicated, control means operable in response to operation of the receiving means at the remote station to connect the transmitting means to the channel to provide signal potential of a predetermined polarity at the remote station, indication receiving means at the control station connected to the channel under the control of the control station supervisory control receiving equipment and responsive to the characteristics of the signal potential, reset means connected in series circuit relation with the channel at the remote station responsive only to a current in the channel greater than that produced by the signal potential and operable to render the control means inoperative and disconnect the transmitting means from the channel, rectifier means of the dry type connected to the channel in shunt relation with the transmitting means to provide a low impedance path for a current from the control station flowing in the same direction as that of the current produced by the signal potential, and means at the control station operable to effect disconnection of the indicating receiving means from the channel and apply a reset potential thereto in series circuit relation with that of the signal potential and of a greater magnitude.

5. In an indicating system for use in transmitting indications of a plurality of different conditions over a supervisory control channel between a control station and a remote station, a plurality of transmitting devices at the remote station for producing indicating potentials having characteristics responsive to different conditions to be indicated, said transmitting devices having different impedances, control means selectively operable under the control of the supervisory control means to connect different ones of the transmitting devices to the channel, indicating means at the control station operable under the control of the supervisory control means to indicate the different conditions in response to the characteristics of the indicating potential, means including a reset relay connected in series circuit relation with the channel and a rectifier device connected across the control channel intermediate the reset relay and the transmitting devices for providing a low impedance shunt path for a current produced by a control potential from the control station of reverse polarity, and means operable to effect disconnection of the indicating means from the channel and connection of the channel to a source of the opposite polarity at the control station.

6. In a remote metering system for use in conjunction with a supervisory control system to indicate at a control station any of a plurality of electric signal potentials at a remote station connected to the control station by a supervisory control channel, in combination, circuit means whereby any desired one of a plurality of devices producing potentials of one polarity may be selectively connected to the supervisory control channel by the supervisory control equipment, a reset relay connected in series circuit relation in the control channel operable to disconnect the selected potential from the channel only in response to an operating current in the channel greater than that produced by said signal potential, a rectifier device connected across the channel to provide a low impedance path through the reset relay independently of the signal potential for a control potential of reverse polarity from the control station for producing an operating current, and means at the remote station operable to apply a potential to the channel which is in series circuit relation with the potential at the remote station when it is desired to disconnect the selected potential from the channel.

7. In a remote metering system, a metering channel, indicating means at one station on the channel responsive to a signal potential, transmitting means at another station on the channel including a variable impedance circuit connected to apply a signal potential of varying characteristics to the channel for operating the indicating means, a control relay having an operating winding connected in series circuit relation with the channel and operable only in response to a current in the channel greater than that produced by the transmitting means, a unidirectional current device connected across the channel between the control relay and the transmitting means to provide a low impedance path for a current from the control station passing through the control relay in the same direction as the current from the transmitting means, and means at said other station for applying a control potential to the channel in such a direction as to be serially related to the signal potential.

WILLARD A. DERR.

REFERENCES CITED

The following references are of record in the file of this patent:

UNITED STATES PATENTS

| Number | Name | Date |
|---|---|---|
| 1,691,360 | Reagan | Nov. 13, 1928 |
| 2,164,379 | Boswau | July 4, 1939 |
| 2,239,552 | De Croce | Apr. 22, 1941 |
| 2,397,401 | Baughman | Mar. 26, 1946 |

FOREIGN PATENTS

| Number | Country | Date |
|---|---|---|
| 201,154 | Great Britain | Sept. 11, 1924 |